United States Patent
Badri-Hoeher et al.

(10) Patent No.: US 8,073,088 B2
(45) Date of Patent: Dec. 6, 2011

(54) METHOD AND COMMUNICATION DEVICE FOR INTERFERENCE CANCELLATION IN A CELLULAR TDMA COMMUNICATION SYSTEM

(75) Inventors: Sabah Badri-Hoeher, Heikendorf (DE); Peter Adam Hoeher, Heikendorf (DE); Claudiu Krakowski, Gröbenzell (DE); Wen Xu, Neubiberg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 603 days.

(21) Appl. No.: 11/535,023

(22) PCT Filed: Mar. 16, 2005

(86) PCT No.: PCT/EP2005/051185
§ 371 (c)(1),
(2), (4) Date: Sep. 25, 2006

(87) PCT Pub. No.: WO2005/094025
PCT Pub. Date: Oct. 6, 2005

(65) Prior Publication Data
US 2007/0201548 A1 Aug. 30, 2007

(51) Int. Cl.
*H04B 1/10* (2006.01)
(52) U.S. Cl. ............... 375/350; 375/229; 375/285
(58) Field of Classification Search ............ 375/229, 375/341, 346, 348, 350, 285
See application file for complete search history.

(56) References Cited

U.S. PATENT DOCUMENTS

| | | | |
|---|---|---|---|
| 6,674,820 B1* | 1/2004 | Hui et al. | 375/346 |
| 7,088,978 B2* | 8/2006 | Hui et al. | 455/296 |
| 7,450,668 B2* | 11/2008 | Ghosh et al. | 375/341 |
| 2002/0021749 A1* | 2/2002 | Lee et al. | 375/150 |
| 2004/0013190 A1* | 1/2004 | Jayaraman et al. | 375/233 |
| 2004/0198296 A1* | 10/2004 | Hui et al. | 455/296 |
| 2007/0127608 A1* | 6/2007 | Scheim et al. | 375/346 |

OTHER PUBLICATIONS

"Space-time processing with a decoupled delayed decision-feedback sequence estimator", IEEE Veh. Techn. Conf. 2002, de Almeida et al, pp. 1269-1273.*

Noafal Dhaher: "A Computationally Efficient FIR MMSE-DFE for CCI Impaired Dispersive Channels", IEEE Transactions on Signal Processing, vol. 45, No. 1, Jan. 1997 pp. 32-41 XP002290136.

Kammeyer et al., "Time Truncation of Channel Impulse Responses by Linear Filtering: A Method to Reduce the Complexity of Viterbi Equalization", Archiv Fur Electronik und Ubertragungstechnik, vol. 48, No. 5, Sep. 1, 1994, pp. 237-243, XP000473231.

Hendrik Schoeneich and Peter A. Hoeher:, "Single Antenna Cochannel Interference Cancellation in Asynchronous TDMA Systems", Proceedings of Sixth Baiona Workshop on Signal Processing in Communications, Sep. 8, 2003, pp. 157-162 XP002290137.

* cited by examiner

Primary Examiner — Jean B Corrielus

(57) ABSTRACT

A system and method for interference cancellation of received data via a communication channel in a cellular communication system having corresponding channel impulse response coefficients. Linear filtering of the received data is performed and thereafter a non-linear detection is executed to get detected data by non-linear signal processing. Filter coefficients are determined for linear pre-filtering of the received data to suppress non-Gaussian interference. The pre-filtered data is further processed by non-linear detection to get detected data.

9 Claims, 6 Drawing Sheets

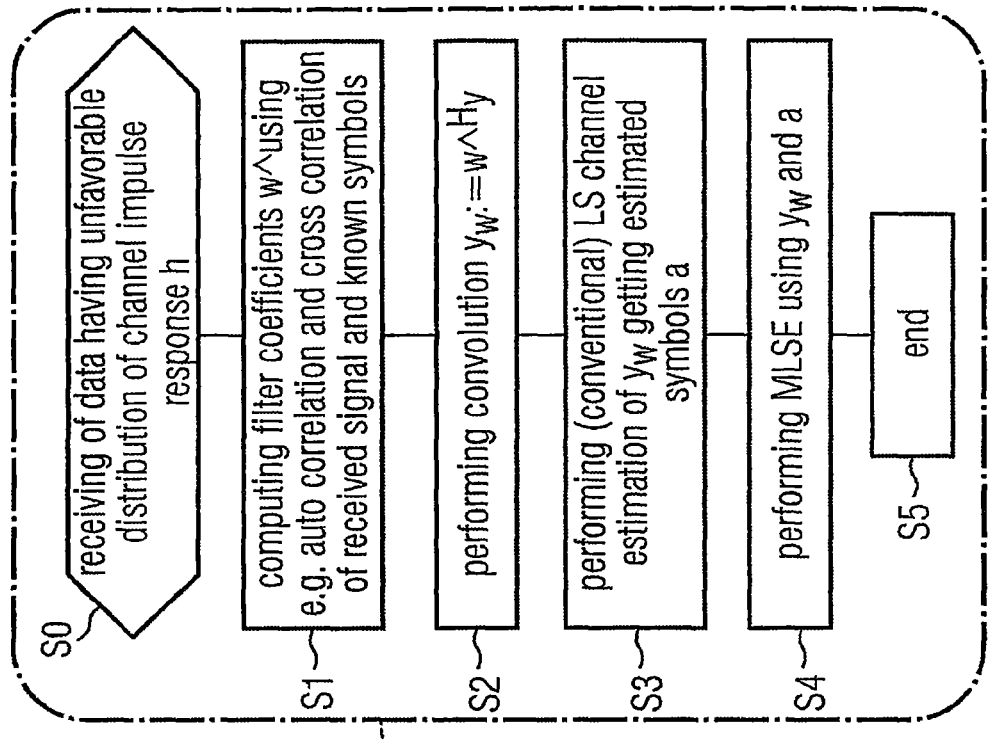
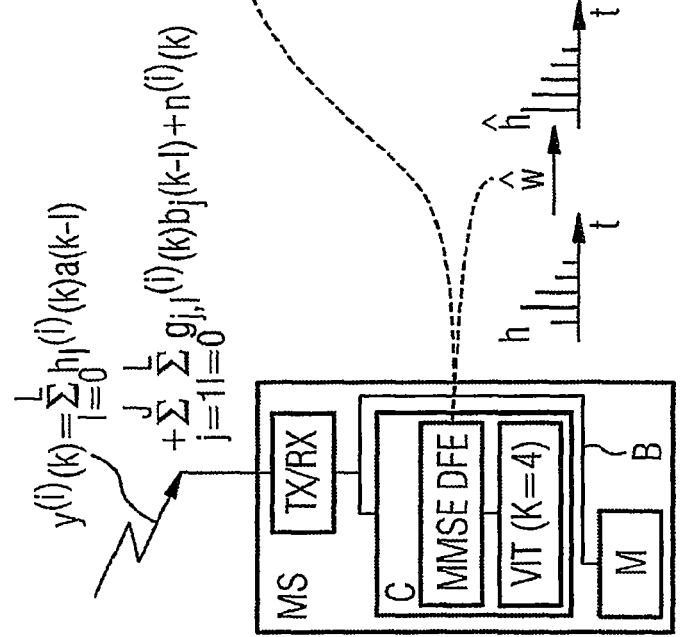

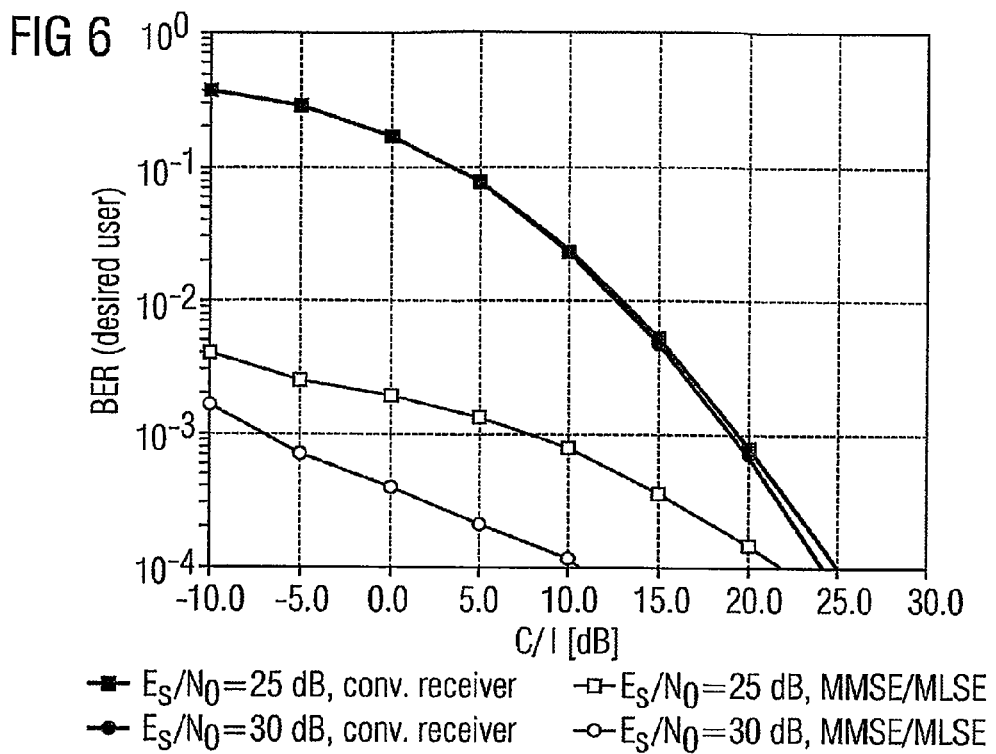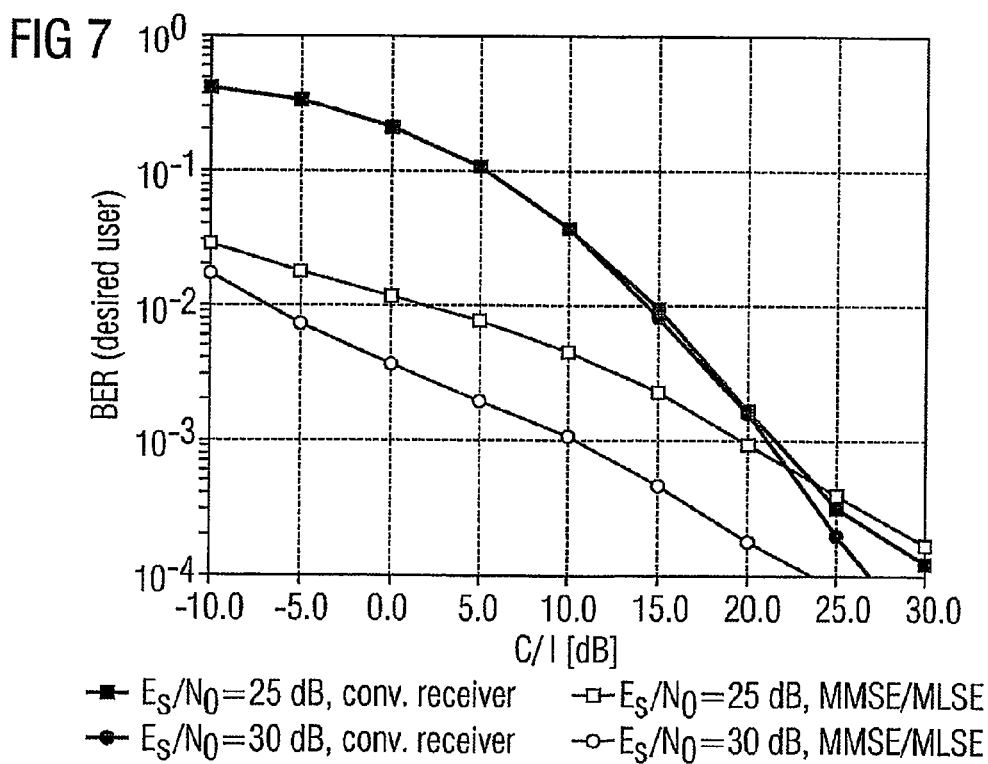

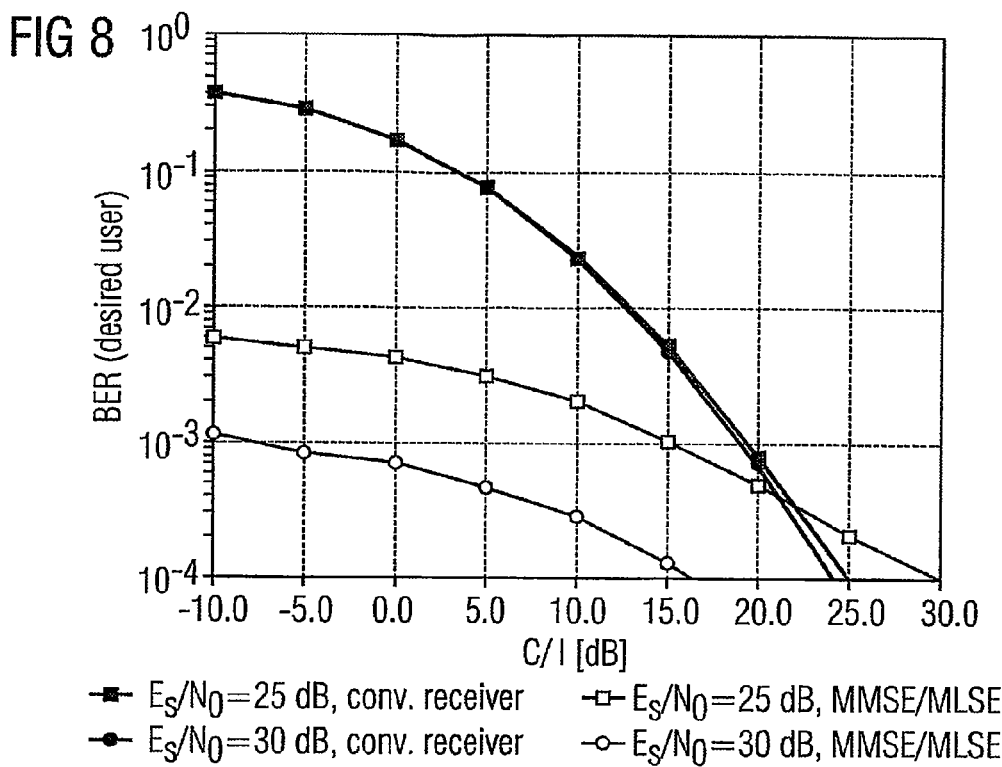
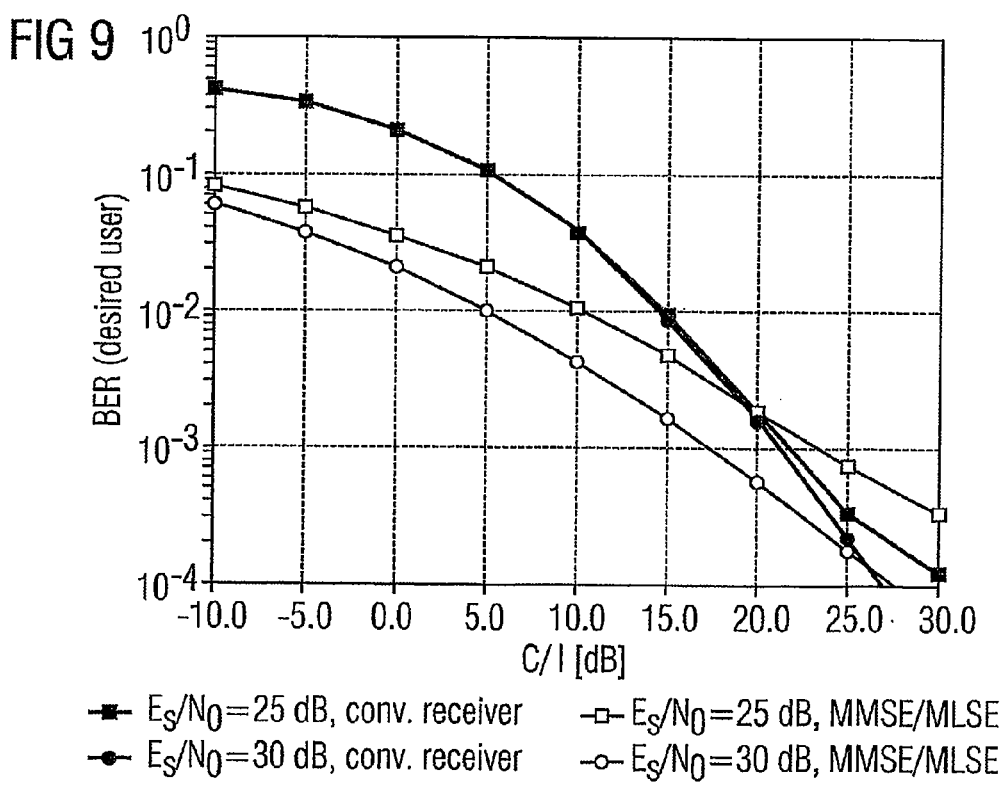

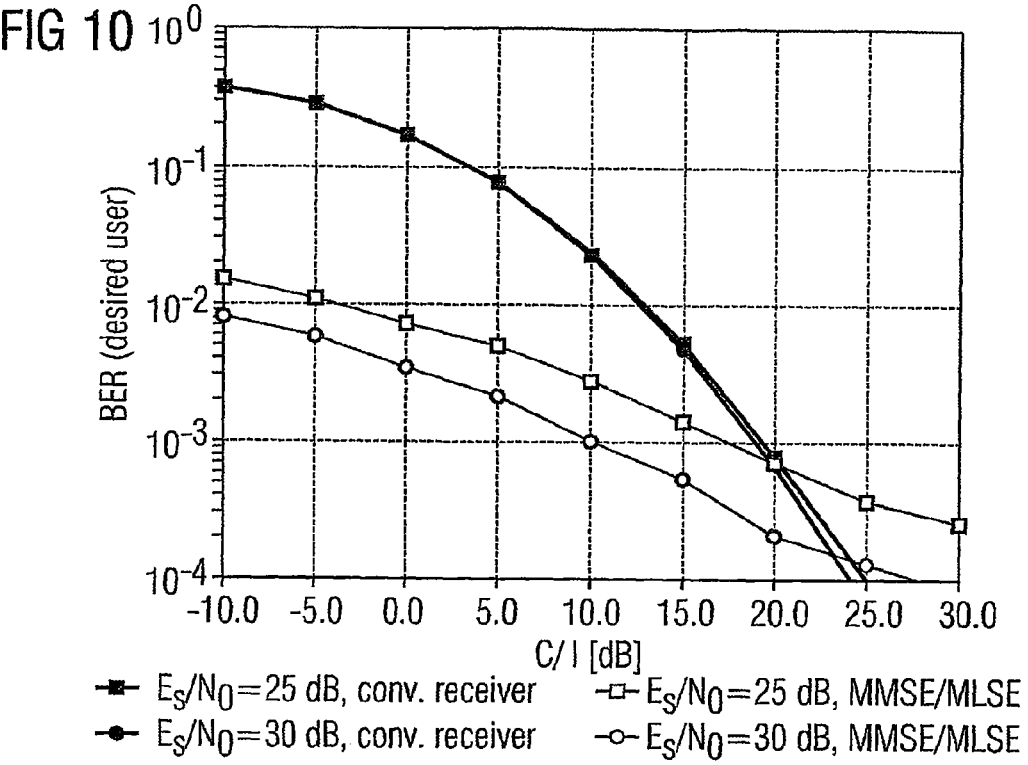
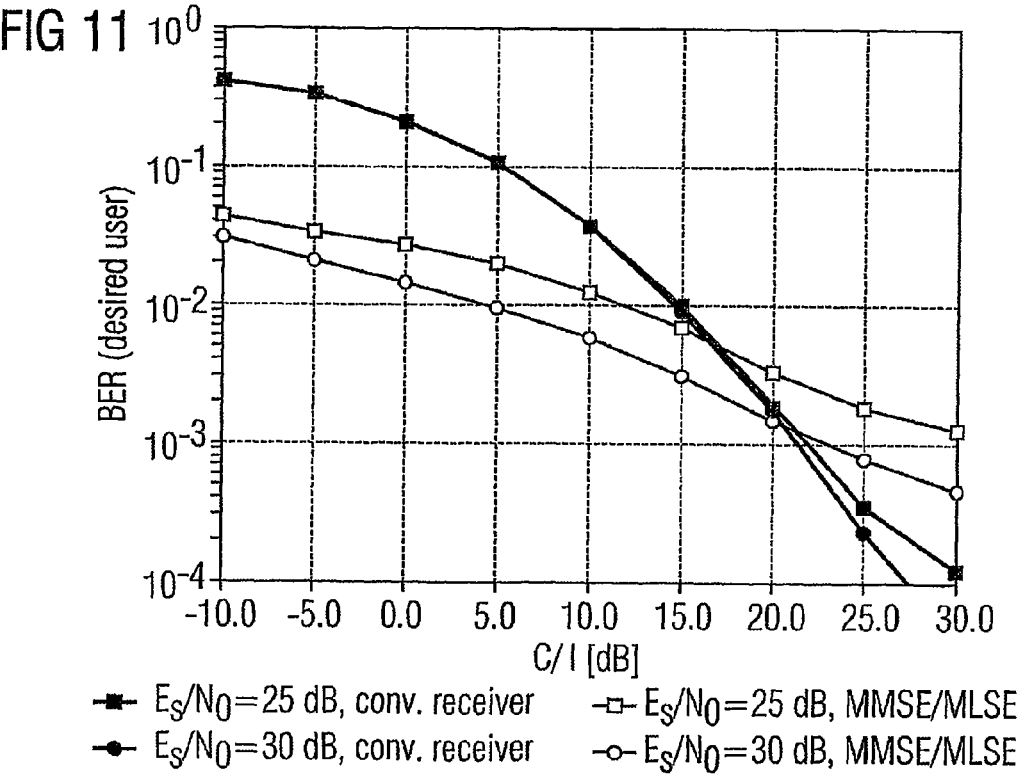

METHOD AND COMMUNICATION DEVICE FOR INTERFERENCE CANCELLATION IN A CELLULAR TDMA COMMUNICATION SYSTEM

FIELD OF TECHNOLOGY

The present disclosure relates to a method for interference cancellation in a cellular TDMA (Time Division Multiple Access) communication system. Further, the invention relates to a communication device for interference cancellation in a cellular TDMA communication system.

BACKGROUND

Single antenna co-channel interference cancellation (SAIC) is important, especially for Global System for Mobile communications/Enhanced Data (GSM/EDGE) downlinks. In field trails, tremendous capacity gains have recently been demonstrated [1] 3G Americas, "SAIC and synchronized networks for increased GSM capacity," particularly for synchronized networks in urban areas. As a consequence, the upcoming GSM/EDGE release will be tightened with respect to interference cancellation.

One of the most challenging tasks is the design of the interference canceller, especially if, due to cost, volume, power consumption, and design aspects, only one receive antenna is available. Most interference cancellers fail if the number of receive antennas do not exceed the number of co-channels [2] J. H. Winters, "Optimum combining in digital mobile radio with co-channel interference," IEEE J. Sel. Areas Commun. vol. 2, no. 4, pp. 528-539, 1984, [3] A. M. Kuzminskiy and D. Hatzinakos, "Semiblind estimation of spatio-temporal filter coefficients based on a training-like approach," IEEE Signal Processing Letters, vol. 5, no. 9, pp. 231-233, September 1998, [4] A. M. Kuzminskiy, C. Luschi, and P. Strauch, "Comparison of linear and MLSE-spatio-temporal interference rejection combining with an antenna array in a GSM System," in Proc. IEEE Veh. Techn. Conf. '00, Tokyo, Japan, pp. 172-176, May 2000.

A receiver structure with linear filtering and decoupled non-linear detection has been studied in [5] D. Giancola, U. Girola, S. Parolari, A. Picciriello, U. Spagnolini, and D. Vincenzoni, "Space-time processing for time varying co-channel interference rejection and channel estimation in GSM/DCS systems," in Proc. IEEE Veh. Techn. Conf. '99, May 1999, [6] S. Ariyavistakul, J. H. Winters, and N. R. Sollenberger, "Joint equalization and interference suppression for high data rate wireless systems," IEEE J. Sel. Areas Commun. vol. 18, no. 7, pp. 1214-1220, July 2000, [7] R. Friedman and Y. Bar-Ness, "Combined channel-modified adaptive array MMSE canceller and Viterbi equalizer," in Proc. IEEE Veh. Techn. Conf. '01, pp. 209-213, 2001, [8] A. L. F. de Almeida, C. M. Panazio, F. R. P. Cavalcanti, and C. E. R. Fernandes, "Space-time processing with a decoupled delayed decision-feedback sequence estimator," in Proc. IEEE Veh. Techn. Conf. '02, Birmingham, Ala., USA, May 2002, [9] K. Kim and G. L. Stuber, "Interference cancelling receiver for range extended reception in TDMA cellular systems," in Proc. IEEE Veh. Techn. Conf. '03, October 2003 using multiple receive antennas. A special case of linear filtering in conjunction with a memory-less detector has been investigated in [10] B. R. Petersen and D. D. Falconer, "Suppression of adjacent-channel, co-channel, and intersymbol interference by equalizers and linear combiners," IEEE Trans. Commun. vol. 42, no. 12, pp. 3109-3118, December 1994, [11] H. Trigui and D. T. M. Slock, "Cochannel interference cancellation within the current GSM standard," in Proc. IEEE ICUPC '98, pp. 511-515, 1998, [3], and [4] for the case of multiple receive antennas. Further, there is known Kammeyer's pre-filter [12] K. D. Kammeyer, "Time truncation of channel impulse responses by linear filtering: A method to reduce the complexity of Viterbi equalization," AEÜ, vol. 48, no. 5, pp. 237-243, 1994, which is designed in order to truncated a single InterSymbol Interference (ISI) channel, but which does not take Co-Channel Interference (CCI) into account. A similar pre-filter has also been proposed by Al-Dhahir and Cioffi [13] N. Al-Dhahir and J. M. Cioffi, "MMSE decision feedback equalizers: Finite-length results," IEEE Trans. Inform. Theory, vol. 41, no. 4, pp. 961-975, July 1995, for the case of Gaussian noise plus interference. In the present case, focus shall be on a few numbers of dominant interferers, which is the typical case in cellular networks, i.e., on non-Gaussian interference. [14] R. Meyer, R. Schober, and W. Gerstacker, EP 1221780 A1, published July 2002 discloses a pre-filter with real-valued processing, being designed according to the principles established in [11]

SUMMARY

Under the exemplary embodiments detailed below, a method and a communication device is disclosed for interference cancellation in a cellular TDMA communication system.

Under one exemplary embodiment, a method is disclosed for interference cancellation of received data being received via a communication channel in a cellular communication system, wherein the data comprises corresponding channel coefficients, such as channel impulse response coefficients. The exemplary method comprises the steps of linear filtering of the received data, and thereafter performing non-linear detection to get detected data by especially non-linear signal processing. Further, there are determined filter coefficients for linear pre-filtering of the received data to suppress non-Gaussian interference when filtering said received data.

According to the exemplary embodiment, a communication device is disclosed for communicating with another device in a cellular communication network, wherein the communication device comprises a receiver unit for receiving data sent from the other device via a communication channel and receiving data sent from at least one further device via an interfering channel. The channels containing corresponding channel coefficients, where at least one processing unit is provided for interference cancellation of the received data and for linear filtering of the received data and, thereafter, for nonlinear detection to get detected data by non-linear signal processing. Further, at least one of the at least one processing units are designed for determining of filter coefficients for linear pre-filtering of the received data to suppress non-Gaussian interference when filtering the received data, wherein the processing unit is designed for performing the aforementioned method.

Under another embodiment, a method, is disclosed for processing pre-filtered data by non-linear detection to get detected symbols.

Under yet another embodiment, a method is disclosed for determining of optimized channel coefficients and using these optimized channel coefficients as coefficients in a decision-feedback equalization to get detected data. Such a method is preferred when performing decision-feedback equalization after the pre-filtering of data. Further, such a method is preferred when the optimized channel coefficients are determined from the filter coefficients and the channel coefficients, especially as a convolution between the filter coefficients and the channel coefficients.

Under yet another embodiment, an auto-correlation is performed of received data and a cross-correlation is performed between a sequence of received data and a sequence of known symbols for determining of the filter coefficients. This method is preferred when the sequence of known symbols are part of sent data corresponding to a part of the received data or being determined from the received data.

Furthermore, a method is disclosed comprising the steps of calculation of an auto-correlation matrix using knowledge of at least one desired channel transmitting desired data and using knowledge of at least one disturbing, especially interfering channel, transmitting disturbing data, wherein the knowledge is determined by channel estimation.

Furthermore, method is disclosed comprising the steps of calculation of an auto-correlation matrix using only knowledge of at least one desired channel transmitting desired data, said knowledge being determined by channel estimation.

Furthermore, a method is disclosed comprising the steps of calculation of an auto-correlation matrix using the received samples, rather than the knowledge of a desired channel transmitting desired data or the knowledge of a disturbing, especially interfering channel, transmitting disturbing data.

Furthermore, a method is disclosed comprising the steps of determining the optimized channel coefficients for a non-linear equalizer by convolution of the filter coefficients with the originally estimated channel coefficients of the desired data.

Furthermore, a method is disclosed comprising the steps of estimating optimized channel coefficients for non-linear equalization using the pre-filtered signal and using channel estimation.

Furthermore, a method is disclosed comprising the steps of processing of the pre-filtered data using a memory-less detector, using a backwardly directed filter of a MMSE-DFE (MMSE-DFE: Minimum Mean Square Error-Decision-Feedback Equalizer) in connection with a memory-less detector, or using a non-linear equalizer.

A communication device and corresponding method is also disclosed, wherein the at least one processing unit is designed as a linear pre-filter to suppress non-Gaussian interference followed by a non-linear detector to cancel intersymbol interference.

A receiver structure is preferred for single-antenna co-channel interference cancellation in cellular TDMA networks. The receiver includes a novel linear pre-filter followed by a non-linear detector. The task of the pre-filter is to suppress non-Gaussian interference, especially to suppress co-channel interference, whereas the task of the non-linear detector is to cancel intersymbol interference. The pre-filter is designed according to the principle of minimum mean square error decision-feedback equalization, without solving an eigenvalue problem. The non-linear detector may be an arbitrary non-linear equalizer, in the simplest case, a memory-less detector. The receiver structure is compatible with conventional TDMA receivers ignoring co-channel interference. Receiver and corresponding method are applicable in cellular communication systems, e.g. GSM.

Under an exemplary receiver structure, Co-Channel Interference (CCI) reduction is separated from Inter-Symbol Interference (ISI) suppression. CCI reduction is done by means of a time-domain linear filter, followed by a non-linear detector in order to perform ISI suppression of the desired users channel. For example, non-linear detector is constructed as a trellis-based, tree-based, graph-based equalizer or as a feedback filter of a decision-feedback equalizer. Besides interference suppression, the linear filter is able to truncate the overall channel impulse response seen by the subsequent non-linear detector. Advantageously, this receiver structure is compatible with conventional TDMA (Time Division Multiple Access) receivers ignoring CCI.

With regard to the receiver structure and resulting method, a linear co-channel interference canceller is typically less sensitive with respect to model mismatch compared to a multi-user-based co-channel interference canceller. Model mismatch may be due to asynchronous interference, non-perfect channel estimation, EDGE interferer in a GSM environment or vice versa, etc.

Besides interference suppression, the linear filter is able to truncate the overall channel impulse response seen by the decoupled non-linear detector. The memory length of the overall channel impulse response is a design parameter.

Since the non-linear detector is matched to a possible-truncated user channel, it is much simpler than a multi-user-based co-channel interference canceller.

In contrast to a similar receiver structure in [5], [6], [7], [8], [9] using multiple receive antennas, single-antenna interference is performed, which is more demanding than space-time processing. Still, multiple antennas fall under the scope of the present disclosure. The preferred pre-filter may be interpreted as a generalization of Kammeyer's pre-filter [12], which is designed in order to truncated a single ISI channel, but which does not take CCI into account. According to one preferred embodiment, the focus is on a few number of dominant interferer, which is the typical case in cellular networks, i.e., on non-Gaussian interference, especially on co-channel interference.

BRIEF DESCRIPTION OF THE DRAWINGS

The various objects, advantages and novel features of the present disclosure will be more readily apprehended from the following Detailed Description when read in conjunction with the enclosed drawings, in which:

FIG. 2 illustrates components of the mobile station used for sequence estimation of received data;

FIG. 3 illustrates a flow chart of a preferred method for performing decoupled linear filtering and non-linear detection;

FIG. 6 illustrates a raw Bit Error Rate (BER) of desired user versus Channel Interference (C/I) using TU50 channel model of GSM, joint Least Square (LS) channel estimation, and a synchronous GSM network;

FIG. 7 illustrates a raw BER of desired user versus C/I using a TU50 channel model, joint LS channel estimation, and a synchronous GSM network;

FIG. 8 illustrates a raw BER of desired user versus C/I using a TU0 channel model of GSM, perfect channel knowledge, and a synchronous GSM network;

FIG. 9 illustrates a raw BER of desired user versus C/I using a TU50 channel model, LS channel estimation for desired user, and a synchronous GSM network;

FIG. 10 illustrates a raw BER of desired user versus C/I using a TU50 channel model, no channel estimation, and a synchronous GSM network; and FIG. 11 illustrates a raw BER of desired user versus C/I using a TU50 channel model, no channel estimation, and an asynchronous GSM network.

DETAILED DESCRIPTION

A method and communication device is disclosed for Single Antenna Interference Cancellation (SAIC) for cellular TDMA networks by means of decoupled linear filtering and especially non-linear detection.

Figure 1:
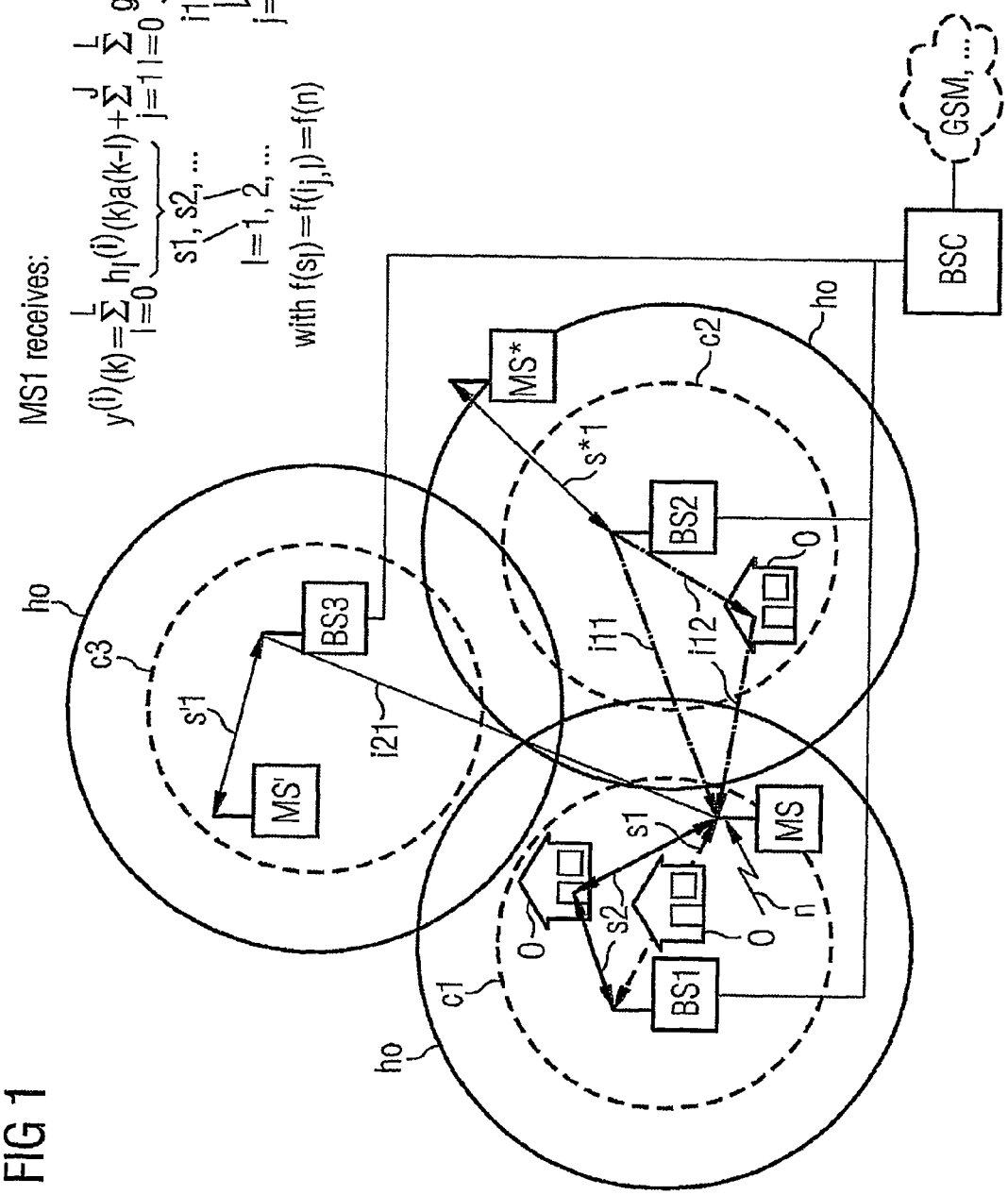
FIG. 1 illustrates a cellular communication network and a mobile station receiving data from a base station of a first cell and receiving co-channel interfering signals from a second base station.

As can be seen from FIG. 1, a mobile station MS, used as a user station, communicates via a radio channel with a first base station BS1 of a cellular communication network GSM. The mobile station stays in a first radio cell c1 around the first base station BS1. Objects O are shown as disturbing communication between the mobile station MS and the base station BS1. A first object O interrupts direct channel path s1 between the first base station BS1 and the mobile station MS. Second object O arranged beside the direct communication path serves as a reflector for radio waves. Therefore, a second communication path s2 transmits radio waves sent by the first base station BS1 and being reflected by the second object O. Therefore, mobile station receives first data via a first communication path s1 and second data via a second communication path s2. Signal strength of data received via different communication paths s1, s2 is different one from each other. Further, data received over second communication path s2 are received to a later time than data received via direct first communication path s1.

The communication network provides further base stations BS2, BS3 each having a communication cell c2, c3, said communication cells c1-c3 being arranged in an overlapping manner. A mobile station MS1 moving from a first cell c1 to a second cell c2 changes from a first base station BS1 to a second base station BS2 after reaching handover regions ho of the overlapping cells. However, before reaching a handover region ho the mobile station MS receives interfering signals i11, i12, i21 from the other base stations BS2, BS3. Especially, the interfering signals are signals sent from the other base stations BS2, BS3 on the same channel to further mobile stations MS*, MS' in their communication cells c2, c3. Therefore, the mobile station receives co-channel interference disturbing the data received from their own first base station BS1. In addition, the mobile station MS1 receives noise n, especially white Gaussian noise.

Usually, the base stations BS1-BS3 of a cellular communication network are connected via a base station controller BSC to other components of the communication network. To avoid co-channel interference base station controller BSC assigns different channels to neighboring cells c1-c3. According to a preferred embodiment same channels shall be used in neighboring cells. In the following it is proposed to use sequence estimation, in the case of GSM a delayed-decision feedback sequence estimation to improve reconstruction of data received by the mobile station MS1 to reduce co-channel interference.

Data y(k) received by the mobile station MS can be represented as:

$$y[k] = \sum_{l=0}^{L} h_l[k]a[k-l] + \sum_{j=1}^{J}\sum_{l=0}^{L} g_{j,i}[k]b_j[k-l] + n[k], \quad (1)$$

$$0 \leq k \leq K-1.$$

The first terms describe the signals s1, s2, ... received via communication paths i. e. communication channels s1, s2 from the first base station BS1. These signal components s1, s2 shall be used by sequence estimation to reconstruct data an originally sent by the first base station BS1. For performing this sequence estimation a channel impulse response hl is used. The channel impulse response hl can be determined from received data or from received special symbols, e.g. a training sequence.

Second sums and terms correspond to the signal components received via interfering communication paths i11, i12, i21 from second and third base stations BS2, BS3. These interfering signal components i11, i12, i21 and in addition further noise components n(k) have to be distinguished by the sequence estimation procedure. Especially, the signal components s1, s2 and the interfering signals components i11, i12, i21 have been sent as interfering data $b_j$ by corresponding base stations BS1, BS2, BS3 using a co-channel especially using same frequency $f(s_i)=f(i_{j,i})=f(n)$. For performing this sequence estimation a channel impulse response $g_{j,l}$ is used. The channel impulse response $g_{j,l}$ can be determined from received data or from received special symbols, e.g. a training sequence.

As can be seen from FIG. 2, mobile station MS comprises a plurality of components. A transmitter or at least a receiver unit TX/RX receives the signal $y^{(i)}(k)$. A processing unit C serves for operating of the mobile station MS and for running processes for digital signal processing. One component of the processor unit C is a viterbi decoder VIT. Shown viterbi decoder VIT uses K=4 states for data processing. Further, mobile station MS comprises a memory M for storing data y to be processed, data a being processed and procedures and programs for processing of the data. Further, mobile user station MS comprises a fractionally-spaced Minimum Mean Square Error Decision-Feedback Equalizer MMSE DFE for pre-filtering of received data y and estimation of data a. Components of the mobile station MS are connected by a data bus B.

As can be seen from FIG. 2, the mobile user station MS receives a received signal y(k) comprising several channel impulse response components. Compared with FIG. 1, the channel impulse response h comprises a first signal component having an intermediate intensity and originating from direct signal path s1 of desired data a sent from first base station BS1. Thereafter, at a later time t, user station MS receives a response channel component via second signal path s2 from desired data sent from first base station BS1. As a possible exception of regular intensity, the signal intensity of second channel impulse response is higher than that of first component because there is an object O within the direct signal path s1 reducing signal strength. Further, channel impulse response components might come from second and third base stations BS2, BS3, i.e., these are co-channel interfering components. Exemplary channel impulse response h illustrated in FIG. 2 is unfavorable for using as channel coefficients in decision-feedback equalizer DFE.

Computed filter coefficients ŵ are then determined in the system. As can be seen from FIG. 5 the filter coefficients ŵ are used for filtering the components of the received signal y in such a way, that pre-filtered data z[k] is optimized for further signal processing. Pre-filtered data z[k] can be used directly for further signal processing in a non-linear detector VIT. Further, pre-filtered data z[k] can be processed by a decision-feedback equalizer DFE. After an estimation of detected data, (i.e. estimated data a[k−k0]) the data can be used for further signal processing and can be delivered to e.g. a viterbi decoder VIT. Detected data correspond to transmitted data as good as possible and can be called as transmitted data, too.

Further, estimated data a[k−k0] is used in decision-feedback equalizer DFE for further processing together with optimized channel impulse response $\tilde{h}=(\tilde{h}1,w,\ldots\tilde{h}L,b)$. The estimated data is delayed up to L times by delaying units z-1. The estimated data a is delayed one time and is processed with first components $\tilde{h}1$, w, and estimated data a delayed two times is processed with second component of optimized channel impulse response $\tilde{h}$, and so on. All in such a way processed data are added. Added data is subtracted from next pre-filtered data value z[k] before next estimation step.

Figure 4:
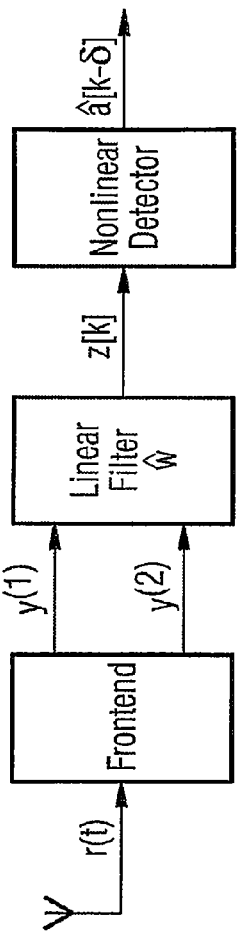
FIG. 4 illustrates a decoupled linear filtering and non-linear detection using a memory-less detector as a non-linear detector.
Figure 5:
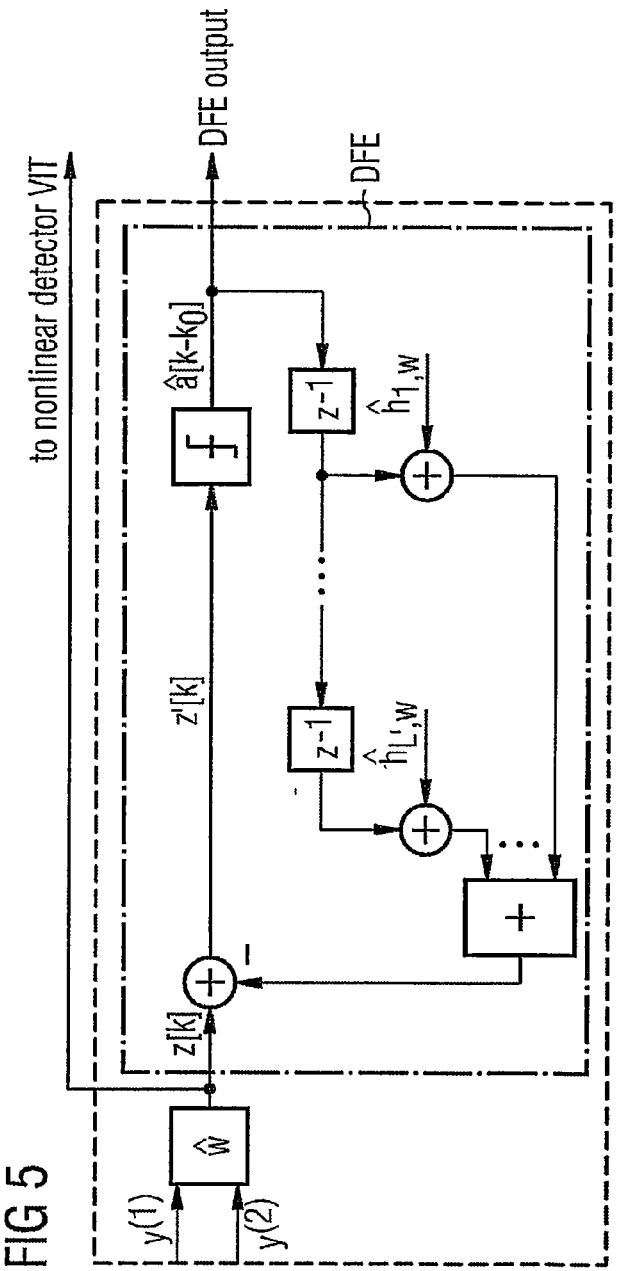
FIG. 5 illustrates a fractionally-spaced Minimum Mean Square Error (MMSE) decision-feedback equalizer.

In summary, as can be seen from FIGS. 4 and 5, the antenna received signal r(t) is pre-processed by a front-end unit to get the received signal y having unfavorable channel impulse response h. By minimizing a cost function C, computed filter coefficients $\hat{w}$ from unfavorable channel impulse response h can be determined. Thereafter, received data y is filtered with computed filter coefficients $\hat{w}$ being a linear pre-filter. Thereafter, pre-filtered data z[k] is processed by a non-linear detector. The non-linear detector uses an optimized channel impulse response $\tilde{h}$, with optimized channel impulse responses being calculated from received signal y and the pre-filter coefficients $\hat{w}$.

As can be seen from FIG. 3, data having unfavorable distribution of channel impulse response h is received in step S0. Thereafter, filter coefficients $\hat{w}$ are computed using, e.g., an auto-correlation and a cross-correlation of received signal y and known symbols in processing step S1. Thereafter, processing step S2 performs a convolution $y_w:=\hat{w}^H y$ to get pre-filtered data z. In processing step S3, a LS (Least Square) channel estimation is performed in a conventional manner to the convoluted signal to get estimated symbols a. In step S4, a minimum Least Square estimation MLSE is performed using convoluted data $y_w$ and the estimated symbols a. After all received data is processed, the process ends S5.

The following provides examples of equivalent discrete-time channel models, and a short description of design rules for implementing a linear filter based on [5], [7], [8]. Further, design rules under exemplary embodiments and disclosed for implementing linear filters, in the presence of non-Gaussian interference. Also, three different options for training the filter are presented. Finally, numerical results are presented and conclusions are drawn.

The equivalent discrete-time channel model considered is given as $$y^{(i)}[k] = \sum_{l=0}^{L} h_l^{(i)}[k]a[k-l] + \sum_{j=1}^{J}\sum_{l=0}^{L} g_{j,l}^{(i)}[k]b_j[k-l] + n^{(i)}[k], \quad (1)$$

$$0 \leq k \leq K-1.$$

where $y^{(i)}[k]\in C$ is a k-th baud-rate output sample of an i-th polyphase channel, L is an effective memory length of the discrete-time ISI channel model, $h_l^{(i)}[k]\in C$ are the channel coefficients of the i-th polyphase channel of a desired user MS $E\{\|h^{(i)}[k]\|^2\}=1$, $g_{j,l}^{(i)}[k]\in C$ are the channel coefficients of the i-th polyphase channel of the j_-th interferer, J is the number of interferer, a[k] and $b_j[k]$ is a k-th independent identically distributed (i.i.d.) data symbol of the desired user and the j-th interferer, respectively, both randomly drawn over an M-ary alphabet $(E\{a[k]\}=E\{b_j[k]\}=0$, $E\{|a[k]|^2\}=E\{|b_j[k]|^2\}=1)$ $n^{(i)}[k]\in C$, is the k-th sample of a Gaussian noise process $(E\{n^{(i)}[k]\}=0, E\{|n^{(i)}[k]|^2\}=N_0/E_s)$, k is a time index, and K is a number of M-ary data symbols per burst. All random processes are assumed to be mutually independent. If the signal bandwidth does not exceed twice the Nyquist bandwidth, two samples per symbol are sufficient. This scenario is assumed in the following. The corresponding polyphase channels are labeled i=1 and i=2, respectively. The channel coefficients $h^{(i)}[k]:=[h_0^{(i)}[k],\ldots,h_L^{(i)}[k]]^T$ and $g_j^{(i)}[k]:=[g_{j,0}^{(i)}[k],\ldots,g_{j,L}^{(i)}[k]]^T$ comprise pulse shaping, the respective physical channel, analog receive filtering, the sampling phase, and the sampling frequency. Without loss of generality, the effective memory length, L, is assumed to be the same for all co-channels. Some coefficients may be zero. In case of square-root Nyquist receive filtering and baud-rate sampling, the Gaussian noise processes of all polyphase channels are white. This case is assumed in the following. The equivalent discrete-time channel model is suitable both for synchronous as well as asynchronous TDMA networks, because time-varying channel coefficients are considered.

Conventional designs of the linear filter were presented to highlight differences and to introduce designs according to a preferred embodiment. For simplicity, a synchronous TDMA network and low speeds of stations MS are assumed in the following for the purpose of filter design. In conjunction with frequency hopping, the second assumption corresponds to a so-called block fading channel model. Correspondingly, the time index k can be dropped for convenience. In case of asynchronous bursts, the channel coefficients are only piecewise constant, i.e., the time index cannot be dropped.

As a design criterion for the linear filter, in exemplarity a maximization of the Signal to Interference plus Noise Ratio (SINR) at the output of the linear filter is chosen:

$$\text{Max} - SINR := \max_{\tilde{w},\tilde{h}_w} \frac{E\{|\tilde{w}^H y|^2\}}{E\{|\tilde{w}^H y - \tilde{h}_w^H a|^2\}} \quad (2)$$

where the maximization is jointly with respect to the filter coefficients, $\tilde{w}$, and the overall channel coefficients including filtering of the desired user, $\tilde{h}_w$.

The filter coefficients can be written in vector form as $\tilde{w}=[\tilde{w}^{(1)T}, \tilde{w}^{(2)T}]^T$, where the filter coefficients of each polyphase channel are given by $\tilde{w}^{(i)}=[\tilde{w}_0^{(i)}, \tilde{w}_1^{(i)},\ldots,\tilde{w}_{L_w}^{(i)}]^T$ and $L_w$ is the filter order of each polyphase channel. Without loss of generality, oversampling by a factor of two is assumed, i.e., $i\in\{1,2\}$.

Note that further oversampling does not lead to any performance improvement in contrast to increasing the number of receive antennas. Specifically, the degree of diversity is not further enhanced.

The output samples of the analog receive filter can be written in vector form as $y=[y^{(1)T}, y^{(2)T}]^T$, where $y^{(i)}=[y^{(i)}[k], y^{(i)}[k-1],\ldots,y^{(i)}[k-L_w]]^T$ and $0\leq k\leq K-1$.

Hypotheses of the overall channel coefficients including filtering of the desired user are denoted as $\tilde{h}_w=[\tilde{h}_{0,w}, \tilde{h}_{1,w},\ldots,\tilde{h}_{L',w}]^T$ where L' is the effective memory length. Note that $\tilde{h}_w$ is symbol spaced. If the filter length $L_w$ is sufficiently large, the filter truncates or is capable to truncate the overall impulse response, i.e., $L'\leq L$. As discussed when describing preferred embodiment, for a well-designed filter in conjunction with a suitable non-linear detector such as a trellis-based, tree-based, or graph-based equalizer, L' is a design parameter. It can be interpreted as the desired memory length of the overall impulse response.

The corresponding data vector is given by $a=[[k-k_0], a[k-k_0-1], \ldots, a[k-k_0-L']]^T$, where $k_0$ is the decision delay of the linear filter, which is often chosen as $k_0=(L_w+1)/2$.

Recall that the coefficients of the linear filter, $\tilde{w}$, and the channel coefficients, $\tilde{h}_w$, are jointly optimized. The optimum filter and channel coefficients with respect to the maximum SINR are denoted as $\hat{w}$ and $\hat{h}_w$, respectively. According to the preferred embodiment these optimum filter and channel coefficients $\hat{w}$ and $\hat{h}_w$, respectively, has to be determined.

A maximization of (2) corresponds to a minimization of the cost function $$C := E\{|\tilde{w}^H y - \tilde{h}_w^H a|^2\} \quad (3)$$

that is $$C_{min} := \min_{\tilde{w}, \tilde{h}_w} \{C\} = \min_{\tilde{w}, \tilde{h}_w} E\left\{ (\tilde{w}^H y - \tilde{h}_w^H a)(\tilde{w}^H y - \tilde{h}_w^H a)^H \right\}. \quad (4)$$

The minimum of C is obtained when the following conditions apply:

$$\frac{\partial C}{\partial \tilde{w}} = 0^T \text{ and } \frac{\partial^2 C}{\partial \tilde{w}^2} \geq 0. \quad (5)$$

By using the Wirtinger derivative of the cost function C we obtain $$\frac{\partial C}{\partial \tilde{w}} = \tilde{w}^H R_{yy} - \tilde{h}_w^H R_{ya}. \quad (6)$$

$R_{yy} := E\{yy^H\}$ denotes the $2(L_w+1) \times 2(L_w+1)$ auto-correlation matrix of the received samples and $R_{ya} := E\{ay^H\}$ denotes the $(L'+1) \times 2(L_w+1)$ cross-correlation matrix between the data sequence and the received samples. Combining (5) and (6), there is obtained the optimum filter coefficients minimizing the cost function C as $$\hat{w}^H = \hat{h}_w^H R_{ya} R_{yy}^{-1}. \quad (7)$$

By substituting (7) into (4), there is obtained $$C_{min} = \hat{h}_w^H [R_{aa} - R_{ya} R_{yy}^{-1} R_{ya}^H] \hat{h}_w, \quad (8)$$

where $R_{aa} := E\{aa^H\} = I$ is the $(L'+1) \times (L'+1)$ auto-correlation matrix of the data symbols $a[k]$, which is an identity matrix due to the assumption of i.i.d. data, $0 \leq k \leq K-1$.

According to conventional concept, equation (8) leads to an eigenvalue problem:

$$[I - R_{ya} R_{yy}^{-1} R_{ya}^H] \hat{h}_w = \lambda_{min} \hat{h}_w \quad (9)$$

Where $\lambda_{min}$ is the smallest eigenvalue of the matrix $[I - R_{ya} R_{yy}^{-1} R_{ya}^H]$. The optimum channel coefficient vector $\hat{h}_w$ is equivalent to the eigenvector corresponding to the smallest eigenvalue $\lambda_{min}$ of the matrix $[I - R_{ya} R_{yy}^{-1} R_{ya}^H]$. To eliminate the trivial result $\hat{h}_w = 0$, a certain constraint has to be defined. Often, the overall impulse response is (i) chosen to be monic, i.e., $\hat{h}_{0,w} = 1$, or (ii) normalized according to $\|\hat{h}_w\|^2 = 1$. In coded systems it may be more suitable, however, to use a linear filter with amplification one.

An insertion of the channel coefficients $\hat{h}_w$ in (7) gives the optimum filter coefficients $\hat{w}$. Hence in the first step the channel coefficients, and in the second step the filter coefficients are computed. The symbol-spaced channel coefficients $\hat{h}_w$ are provided to the decoupled non-linear detector.

The main problem of the conventional filter design discussed so far is the computational complexity. It appears to be very difficult to solve the eigenvalue problem (9), even by means of a Cholesky factorization as proposed in [5].

According to an exemplary embodiment, in the following there is presented a filter design that is much simpler to solve and which leads to further insights.

A preferred method for calculating the coefficients of the linear filter is based on an MMSE-DFE equalizer. It is shown in the following that the feedforward filter of a fractionally-spaced MMSE-DFE equalizer is equivalent to the desired linear filter. The solution can be written in closed form. The computational complexity is much less than solving the corresponding eigenvalue problem. The filter design gives insight with respect to impulse response truncation.

The proposed solution generalizes the known receiver published in [12], which does not consider interference cancellation and which applies a symbol-spaced feedforward filter.

In order to derive the filter coefficients, there is considered the fractionally-spaced MMSE-DFE shown in FIG. 5. The task of the fractionally-spaced feedforward filter is, besides interference suppression, to truncate the overall impulse response. After suitable filtering, effectively $L'+1$ channel coefficients remain. $L'$ of the remaining channel coefficients are eliminated by the symbol-spaced feedback filter. Hence, the non-linear detector attached to the feedforward filter shall be able to handle $L'+1$ channel coefficients. For example, a Viterbi detector with $K=M^{L'}$ states or related techniques may be applied. The feedback filter and the memory-less detector featured in FIG. 5 do not have to be implemented actually. They are for conceptional purposes only and may be substituted by any non-linear equalizer.

If correct decisions are assumed, the feedforward filter and the feedback filter of the MMSE-DFE are adapted so that the cost function $$C := E\{|z'[k] - a[k-k_0]|^2\} \quad (10)$$

$$= E\left\{ \left| \tilde{w}^H y - \tilde{h}_w^H a - a[k-k_0] \right|^2 \right\}$$

is minimized with respect to $\tilde{w}$ and $\tilde{h}_w$. The vectors $\tilde{w}$ and y are the same as defined above. In (10), the data sequence is defined as $a=[a[k-k_0-1], \ldots, a[k-k_0-L']]^T$, and the overall channel coefficients of the desired user are defined as $\tilde{h}_w = [\tilde{h}_{1,w}, \tilde{h}_{2,w}, \ldots, \tilde{h}_{L',w}]^T$. The parameter $k_0$ is the decision delay and $L'$ is the effective memory length of the overall channel impulse response of the desired user. $k_0$ and $L'$ are design parameters. Note that the MMSE design criterion is the same as maximizing the SINR as considered above, if the overall impulse response is monic, cf. (3) and (10).

The Wirtinger partial derivatives, which minimize the cost function C, are given as follows:

$$\frac{\partial C}{\partial \tilde{w}} = 0^T \text{ and } \frac{\partial C}{\partial \tilde{h}_w} = 0^T. \quad (11)$$

Assuming i.i.d. data, after some calculation the following relations are obtained:

$$\hat{w}^H R_{yy} = \hat{h}_w^H R_{ya} + r_{ya}^H \quad (12)$$

and $$\hat{h}_w^H = \hat{w}^H R_{ya}^H. \quad (13)$$

As defined before, denotes the $2(L_w+1) \times 2(L_w+1)$ auto-correlation matrix of the received samples y(i)(t) and $R_{ya} := E\{ay^H\}$ denotes the $L' \times 2(L_w+1)$ cross-correlation matrix between the data a(i) and the received samples y(i)(t), and the $2(L_w+1)$ vector is defined as $r_{ya} = [r_{ya}[k_0], r_{ya}[k_0-1], \ldots, r_{ya}[k_0-2L_w]]^T := E\{a^*[k-k_0]y\}$. Upon insertion of (13) in (12) the optimum filter coefficients are obtained as $$\hat{w}^H = r_{ya}^H [R_{yy} - R_{ya}^H R_{ya}]^{-1}. \quad (14)$$

The corresponding channel coefficient vector h__ is obtained by inserting (14) into (13). Hence, in the proposed solution the filter coefficients are computed prior to the channel coefficients. The symbol-spaced channel coefficients $\hat{h}_w$ are provided to the decoupled non-linear detector. According to (13), (17) and (18), the overall channel coefficients $\hat{h}_w$ can be written as a convolution between the filter coefficients, $\hat{w}$, and the channel coefficients, h.

The solution discussed so far is suitable for complex symbol alphabets such as 8-PSK (PSK: Phase Shift Keying). For one dimensional symbol alphabets such as M-PAM (M-ary-Pulse Amplitude Modulation) or derogated GMSK (Gaussian Minimum Shift Keying), the performance can be improved by applying real-valued processing as proposed in [11].

According to a first case (A) there is performed a calculation of correlation matrices in case of available channel estimates.

In the conventional solution as well as in the proposed preferred solution, in particular the auto-correlation and cross-correlation matrices $R_{yy} := E\{yy^H\}$ and $R_{ya} := E\{ay^H\}$ have to be computed for each burst. This computation can be done in a straightforward manner by taking the expected values $E\{yy^H\}$ and $E\{ay^H\}$ without applying any channel knowledge.

However, in case of i.i.d. data there can be observed a significant performance improvement compared to using a short training sequence if channel estimates are used. According to the first case, we assume that channel estimates for the desired user as well as for the interferer are available. This assumption is suitable for synchronous TDMA networks e.g. using defined training sequences. According to a second case, we assume that channel estimates are only available for the desired user, a scenario that is more suitable for asynchronous TDMA networks. According to a third case, we assume that no channel estimates are available for the filter design.

Consider the auto-correlation matrix $R_{yy}$ defined as $$R_{yy} := E\{yy^H\} \quad (15)$$

$$= \begin{bmatrix} r_{yy}(0,0) & r_{yy}(0,1) & \cdots & r_{yy}(0, 2L_w+1) \\ r_{yy}(1,0) & r_{yy}(1,1) & \cdots & r_{yy}(1, 2L_w+1) \\ \vdots & \vdots & \cdots & \vdots \\ r_{yy}(2L_w+1, 0) & r_{yy}(2L_w+1, 1) & \cdots & r_{yy}(2L_w+1, 2L_w+1) \end{bmatrix}.$$

In case of i.i.d data, the elements of the $2(L_w+1) \times 2(L_w+1)$ auto-correlation matrix can be calculated as follows:

$$r_{yy}(i,j) = \begin{cases} \sum_{l=0}^{L} h_l^{(1)}(h_{l+i-j}^{(1)})^* + \sum_{m=1}^{J} \sum_{l=0}^{L} g_{m,l}^{(1)}(g_{m,l+i-j}^{(1)})^* + \sigma_n^2 \delta_{j-i}, 0 \le i, j \le L_w \\ \sum_{l=0}^{L} h_l^{(1)}(h_{l+i-j}^{(2)})^* + \sum_{m=1}^{J} \sum_{l=0}^{L} g_{m,l}^{(1)}(g_{m,l+i-j}^{(2)})^* + \sigma_n^2 \delta_{j-i}, 0 \le i \le L_w, L_w+1 \le j \le 2L_w+1 \\ \sum_{l=0}^{L} h_l^{(2)}(h_{l+i-j}^{(1)})^* + \sum_{m=1}^{J} \sum_{l=0}^{L} g_{m,l}^{(2)}(g_{m,l+i-j}^{(1)})^* + \sigma_n^2 \delta_{j-i}, L_w+1 \le i \le 2L_w+1, 0 \le j \le L_w \\ \sum_{l=0}^{L} h_l^{(2)}(h_{l+i-j}^{(2)})^* + \sum_{m=1}^{J} \sum_{l=0}^{L} g_{m,l}^{(2)}(g_{m,l+i-j}^{(2)})^* + \sigma_n^2 \delta_{j-i}, L_w+1 \le i, j \le 2L_w+1 \end{cases} \quad (16)$$

where $\sigma_n^2$ is the noise variance. Correspondingly, the elements $r_{ya}(i,j)$ of the $L' \times 2(L_w+1)$ cross-correlation matrix $$R_{ya} := E\{ay^H\} = \begin{bmatrix} r_{ya}(1,0) & r_{ya}(1,1) & \cdots & r_{ya}(1, 2L_w+1) \\ r_{ya}(2,0) & r_{ya}(2,1) & \cdots & r_{ya}(2, 2L_w+1) \\ \vdots & \vdots & \cdots & \vdots \\ r_{ya}(L', 0) & r_{ya}(L', 1) & \cdots & r_{ya}(L', 2L_w+1) \end{bmatrix} \quad (17)$$

can be calculated as $$r_{ya}(i,j) = \begin{cases} \left(h_{k_0+1-j}^{(1)}\right)^*, 1 \le i \le L', 0 \le j \le L_w \\ \left(h_{k_0+1-j}^{(2)}\right)^*, 1 \le i \le L', L_w+1 \le j \le 2L_w+1 \end{cases}. \quad (18)$$

Finally, the elements of the cross-correlation vector $r_{ya}$ can be computed as $$r_{ya}(i) = \begin{cases} h_{k_0-i}^{(1)}, 0 \le i \le L_w \\ h_{k_0-i}^{(2)}, L_w+1 \le i \le 2L_w+1 \end{cases}. \quad (19)$$

Note that for each burst estimates of h and $g_j$, $1 \le j \le J$ and an estimate of the noise variance $\sigma_n^2$ have to be known at the receiver. The degradation is small, however, if a constant noise variance, e.g. $\sigma_n^2 = 0.001$, is assumed. Though an explicit knowledge of the data is not necessary, training sequences are helpful in order to compute the channel estimates.

Second case (B) regards to a calculation of correlation matrices in case that channel estimates are not available for the interferer.

Particularly in asynchronous TDMA networks, an estimation of the channel coefficients of the interferer is difficult. In case that estimates of the channel coefficients of the desired user are available, but estimates of the channel coefficients of the interferer are not available, the auto-correlation matrix $R_{yy}$ can be approximated as follows:

The main idea is to partition $R_{yy}$ in the form $$R_{yy} = E\{y_d y_d^H\} + E\{y_{i+n} y_{i+n}^H\} = R_{yy}^d + R_{yy}^{i+n}, \tag{20}$$

Where $y_d^{(i)}[k]$, $$y_d^{(i)}[k] = \sum_{l=0}^{L} h_l^{(i)}[k] a[k-l], \tag{21}$$

corresponds to the desired user and $y_{i+n}^{(i)}[k]$ $$y_{i+n}^{(i)}[k] = \sum_{m=1}^{J} \sum_{l=0}^{L} g_{m,l}^{(i)}[k] b_m[k-l] + n^{(i)}[k] \tag{22}$$

corresponds to the interferer plus noise in case of two interferers $i \in \{1,2\}$. The elements of the auto-correlation matrix $R_{yy}^d$ can determined for several possible cases and can be written as $$r_{yy}^d(i,j) = \begin{cases} \sum_{l=0}^{L} h_l^{(1)}(h_{l+1-j}^{(1)})^*, & 0 \le i, j \le L_w \\ \sum_{l=0}^{L} h_l^{(1)}(h_{l+1i-j}^{(2)})^*, & 0 \le i \le L_w, L_w+1 \le j \le 2L_w+1 \\ \sum_{l=0}^{L} h_l^{(2)}(h_{l+i-j}^{(1)})^*, & L_w+1 \le i \le 2L_w+1, 0 \le j \le L_w \\ \sum_{l=0}^{L} h_l^{(2)}(h_{l+i-j}^{(2)})^*, & L_w+1 \le i, j \le 2L_w+1 \end{cases} \tag{23}$$

The elements of the auto-correlation matrix $R_{yy}^{i+n}$ can be approximated correspondingly as $$r_{yy}^{i+n}(i,j) \approx \tag{24}$$

$$\begin{cases} \dfrac{1}{K'} \sum_{k=k_0}^{K'+k_0-1} y_{i+n}^{(1)}[k-i](y_{i+n}^{(1)}[k-j])^*, & 0 \le i, j \le L_w \\ \dfrac{1}{K'} \sum_{k=k_0}^{K'+k_0-1} y_{i+n}^{(1)}[k-i](y_{i+n}^{(2)}[k-j])^*, & 0 \le i \le L_w, L_w+1 \le j \le 2L_w+1 \\ \dfrac{1}{K'} \sum_{k=k_0}^{K'+k_0-1} y_{i+n}^{(2)}[k-i](y_{i+n}^{(1)}[k-j])^*, & L_w+1 \le i \le 2L_w+1, 0 \le j \le L_w \\ \dfrac{1}{K'} \sum_{k=k_0}^{K'+k_0-1} y_{i+n}^{(2)}[k-i](y_{i+n}^{(2)}[k-j])^*, & L_w+1 \le i, j \le 2L_w+1 \end{cases}$$

Where $y_{i+n}^{(i)}[k] := y^{(i)}[k] - y_d^{(i)}[k]$. The parameter K' is the length of the training sequence if training symbols are used in order to calculate $R_{yy}^{i+n}$. If tentative decisions are used in order to calculate the $R_{yy}^{i+n}$, the parameter K' is the burst length. Note that no additional noise variance estimation is needed.

Third case (C) regards to a calculation of correlation matrices in case that no channel estimates are available.

In the case that co-channel interference is strong, channel estimates for the desired user are poor in synchronous and asynchronous networks. Also, channel estimates for the interferer are difficult to obtain in asynchronous networks. For these reasons, the following novel solution is proposed, where no channel estimation and no estimation of the noise variance is necessary for the design of the linear filter.

In a first step, there are computed the filter coefficients $$\hat{w}^H = r_{ya}^H [R_{yy} - R_{ya}^H R_{ya}]^{-1}, \tag{25}$$

Where $R_{yy}$, $R_{ya}$ and $r_{ya}^H$ are computed as follows.

Again, the elements of the auto-correlation matrix can be approximated as $$r_{yy}(i,j) \approx \begin{cases} \dfrac{1}{K'} \sum_{k=k_0}^{K'+k_0-1} y^{(1)}[k-i](y^{(1)}[k-j])^*, & 0 \le i, j \le L_w \\ \dfrac{1}{K'} \sum_{k=k_0}^{K'+k_0-1} y^{(1)}[k-i](y^{(2)}[k-j])^*, & 0 \le i \le L_w+, 1 \le j \le 2L_w+1 \\ \dfrac{1}{K'} \sum_{k=k_0}^{K'+k_0-1} y^{(2)}[k-i](y^{(1)}[k-j])^*, & L_w+1 \le i \le 2L_w+1, 0 \le j \le L_w \\ \dfrac{1}{K'} \sum_{k=k_0}^{K'+k_0-1} y^{(2)}[k-i](y^{(2)}[k-j])^*, & L_w+1 \le i, j \le 2L_w+1 \end{cases} \tag{26}$$

A parameter K' is the length of the training sequence if training symbols are used in order to calculate $R_{ya}$. If tentative decisions are used in order to calculate $R_{ya}$, the parameter K' is the burst length.

Correspondingly, the elements of the cross-correlation matrix $R_{ya}$ can be approximated as $$r_{ya}(i,j) \approx \begin{cases} \dfrac{1}{K'} \sum_{k=k_0}^{K'+k_0-1} a[k-k_0-i](y^{(1)}[k-j])^*, & 1 \le i \le L', 0 \le j \le L_w \\ \dfrac{1}{K'} \sum_{k=k_0}^{K'+k_0-1} a[k-k_0-i](y^{(2)}[k-j])^*, & 1 \le i \le L', L_w+1 \le j \le 2L_w+1 \end{cases} \tag{27}$$

Finally, the elements of the cross-correlation vector $r_{ya}$ can be approximated as $$r_{ya}(i) \approx \begin{cases} \dfrac{1}{K'} \sum_{k=k_0}^{K'+k_0-1} a[k-k_0](y^{(1)}[k-i])^*, & 0 \le i \le L_w \\ \dfrac{1}{K'} \sum_{k=k_0}^{K'+k_0-1} a[k-k_0](y^{(2)}[k-i])^*, & L_w+1 \le i \le 2L_w+1 \end{cases} \tag{28}$$

In a second step, the convolution $$y_w := w^H y \tag{29}$$

is performed.

In a third step, a conventional LS channel estimation is done given $y_w$ and a. Due to the interference suppression, the channel estimation error is reasonably small. Finally, MLSE of the desired user is done given $y_w$ and the estimated channel coefficients.

For the numerical results presented in FIG. 6-FIG. 11, the following general scenarios are assumed as synchronous or asynchronous GSM network, having J=1 dominant interferer, having uniformly distributed training sequence code (TSC) for desired user and interferer, having TSC of dominant interferer differs from TSC of desired user, this can be managed by the network operator, using TU0 & TU50 channel model according to GSM, setting L=3, using a decoupled MMSE filter/Viterbi detector, said proposed receiver being compatible with the conventional GSM receiver, and using real-valued processing in MMSE filter.

In FIG. 6 and FIG. 7 $L_w$=11 corresponds to 48 real-valued filter coefficients. In FIG. 8 to FIG. 11 $L_w$=4 corresponds to 20 real-valued filter coefficients. Further, L'=L=3, i.e. no truncation has been used, i.e., $M^{L'}$=8 state Viterbi detector.

FIG. 6 and FIG. 7 illustrate calculation of correlation matrices according first case A, FIG. 8 and FIG. 9 illustrate second case B, and FIG. 10 and FIG. 11 illustrate third case C. Further, there has been used statistically independent bursts. There is illustrated the Bit Error Rate of the signal components of the desired user versus C/I in dB.

Not filled spots and boxes show values according to performing signal processing according to preferred embodiment. As a reference, performance results for the conventional receiver are included as well as black filled spots and boxes. The performance/complexity trade-off is quite remarkable. Particularly, note that in FIG. 10 and FIG. 11 no channel estimation is used.

Numerical results shown for the popular GSM system illuminate significant performance improvements. The performance may be further improved (i) by iterative processing and (ii) by introducing a weighting factor ρ, which is a function of the SINR, in conjunction with $$R_{yy'} = R_{yy'}^d + \rho R_{yy'}^{i+n} \qquad (30)$$

in order to avoid performance degradation compared to the conventional receiver at high SINR. The weighting factor_ may be obtained by a table-look-up. Although oversampling is assumed, degradation in case of a symbol-spaced implementation is not serious.

When determining, i. e. calculating the auto-correlation matrix it is possible to use knowledge of at least one desired channel transmitting desired data from first base station BS1 and using knowledge of at least one disturbing, especially interfering channel transmitting disturbing data from e. g. second and third base stations BS2, BS3 said knowledge being determined by channel estimation in the decision-feedback equalizer DFE. According to second case B, calculation of the auto-correlation matrix is done using only knowledge of at least one desired channel transmitting desired data. According to third case C, calculation of the auto-correlation matrix is done using neither knowledge of a desired channel transmitting desired data nor using knowledge of a disturbing, especially interfering channel transmitting disturbing data.

When designing the filter coefficients for pre-filtering there can be considered only one or a plurality of receiving antennas. Further, the filter coefficients can consider data received according to the timing of the symbols or can consider oversampling. The filter coefficients can be designed as real or complex coefficients. Further, the filter coefficients for pre-filtering can be improved by an iterative method.

In addition, it is possible under the present disclosure to estimate the SINR for controlling the design of the filter coefficients to avoid a degradation compared with a conventional receiver in case of high SINR.

Further, it is possible under the present disclosure to process the output signal of the pre-filter process i.e., the pre-filtered data z using a memory-less detector, using a backwardly directed filter of a MMSE-DFE equalizer together with a memory-less detector, or using a non-linear equalizer, e.g., a Trellis tree or graph based equalizer.

It is preferred to use channel coefficients, especially coefficients of channel impulse response, of a non-linear equalizer corresponding to the coefficients of an MMSE-DFE backwardly directed filter.

Advantageously, the channel coefficients of the non-linear equalizer can be determined or calculated by convolution of the coefficients of the pre-filter with the originally estimated channel coefficients of the desired signal. Further, it is possible to estimate the channel coefficient of the non-linear equalizer from the pre-filtered received signal with aid of a channel estimator.

Summarized, a decoupled linear filter/non-linear detector was developed. The purpose of the fractionally-spaced linear filter is to suppress CCI and to shorten the overall impulse response. The purpose of the non-linear detector is ISI rejection for the desired user. The receiver structure is compatible with conventional TDMA receivers.

Adaptation techniques for receives (such as are described in [12]) using linear filters, that take channel knowledge of the desired user and, optionally, of the interferer into account. Also, the case of no channel estimation for the purpose of designing the linear filter is considered.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method for interference cancellation of data received via a communication channel in a cellular communication system having corresponding channel coefficients, the method comprising:
   (a) performing linear pre-filtering of the received data using at least one processing unit;
   (b) determining linear pre-filter coefficients for linear pre-filtering of the received data using the at least one processing unit, wherein the pre-filter coefficients are used to suppress non-Gaussian interference during filtering of the received data;
   (c) determining optimized channel coefficients using the linear pre-filter coefficients; and
   (d) determining detected data by:
      (i) using the at least one processing unit, performing non-linear detection via signal processing; and
      (ii) using the optimized channel coefficients as an input when performing the non-linear detection.

2. The method of claim 1, which includes determining the optimized channel coefficients based on a maximum value of a signal-to interference/noise ratio.

3. The method of claim 2, wherein the optimized channel coefficients are determined by a convolution between the linear pre-filter coefficients and the channel coefficients for a desired user.

4. The method of claim 3, wherein the optimized channel coefficients are determined by a channel estimator that uses pre-filtered data.

5. The method of claim 1, which includes determining the optimized channel coefficients for a non-linear equalizer by convolution of the filter coefficients using estimated channel coefficients of desired data.

6. The method of claim 1 which includes processing of pre-filtered data using a memory-less detector, using a backwardly directed filter of a Minimum Mean Square Error-Decision-Feedback Equalizer (MMSE-DFE) in connection with the memory-less detector.

7. The method of claim 1, wherein performing non-linear detection includes processing of the pre-filtered data using a non-linear equalizer.

8. A communication device for communicating to users in a cellular communication network, the communication device comprising:
- a receiver unit that receives:
  - (a) first data sent from another device over a communication channel; and
  - (b) second data sent from at least one further device via an interfering channel, wherein the channels have corresponding channel coefficients in relation to a desired user; and
- at least one processing unit coupled to a memory, the memory storing instructions that, when executed by the processing unit, cause the processing unit to:
  - (a) performs linear pre-filtering of the received first and second data;
  - (b) determines linear pre-filter coefficients for linear pre-filtering of the received first and second data, wherein the filter coefficients are used to suppress non-Gaussian interference during filtering of the received first and second data;
  - (c) determines optimized channel coefficients using the linear pre-filter coefficients; and
  - (d) determines detected data by:
    - (i) performing non-linear detection via signal processing; and
    - (ii) using the optimized channel coefficients as an input when performing the non-linear detection.

9. The communication device of claim 8, wherein one of the at least one processing unit is a linear pre-filter for suppressing non-Gaussian interference, followed by a non-linear detector to cancel intersymbol interference.

* * * * *

UNITED STATES PATENT AND TRADEMARK OFFICE
CERTIFICATE OF CORRECTION

PATENT NO. : 8,073,088 B2  Page 1 of 1
APPLICATION NO. : 11/535023
DATED : December 6, 2011
INVENTOR(S) : Sabah Badri-Hoeher et al.

It is certified that error appears in the above-identified patent and that said Letters Patent is hereby corrected as shown below:

Title Page, above Item (65) insert:
-- (30) Foreign Application Data
March 25, 2004 (EP).........................040072211.1--

In column 16, line 60, in Claim 2, delete "signal-to" and insert -- signal to --, therefor.
In column 18, line 4, in Claim 8, delete "performs" and insert -- perform --, therefor.
In column 18, line 6, in Claim 8, delete "determines" and insert -- determine --, therefor.
In column 18, line 11, in Claim 8, delete "determines" and insert -- determine --, therefor.
In column 18, line 13, in Claim 8, delete "determines" and insert -- determine --, therefor.

Signed and Sealed this
Fifteenth Day of January, 2013

David J. Kappos
*Director of the United States Patent and Trademark Office*